R. O. DEULEN.
CHARGE PREPARING APPARATUS.
APPLICATION FILED DEC. 29, 1916.
1,228,415.
Patented June 5, 1917.
2 SHEETS—SHEET 1.
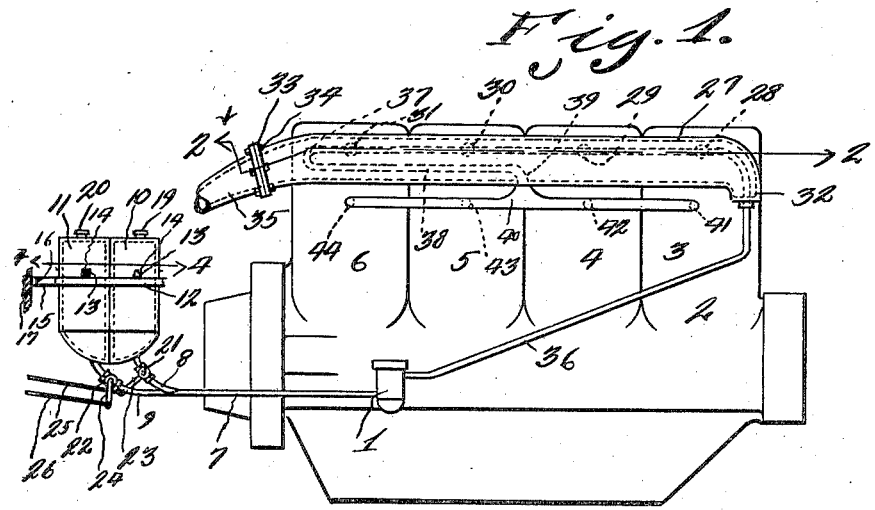
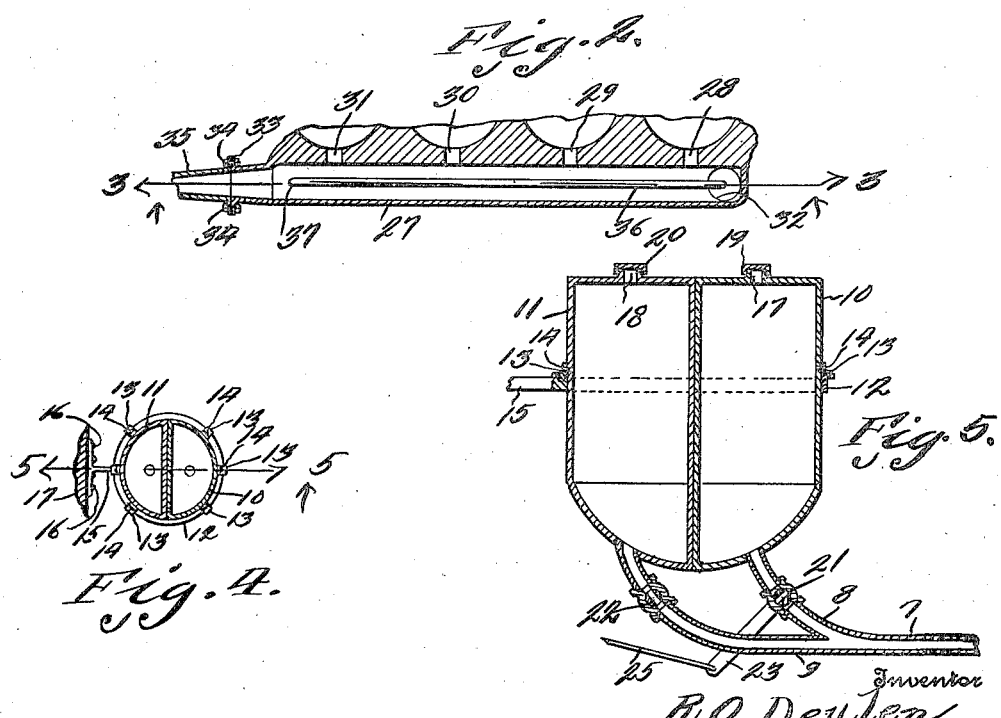

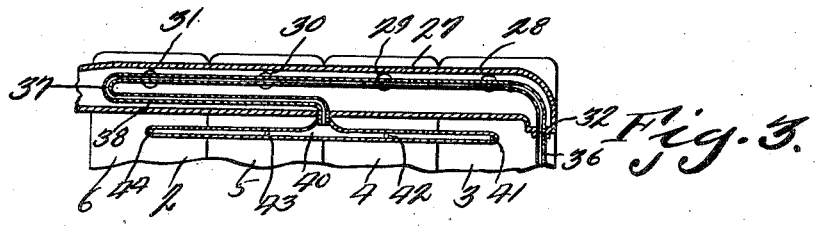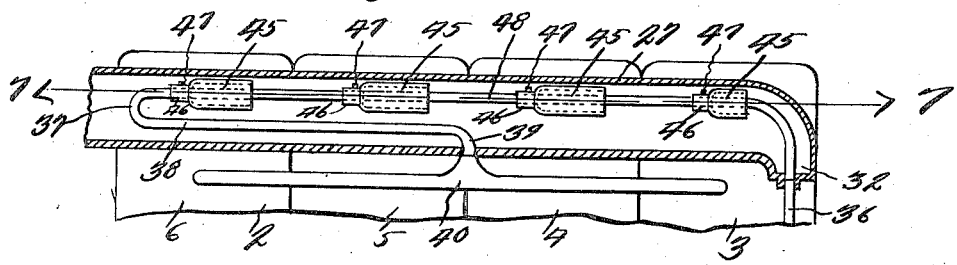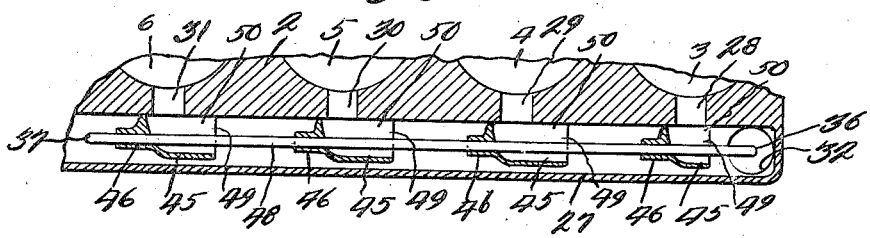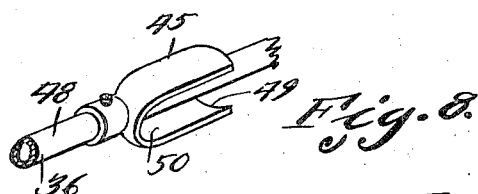

UNITED STATES PATENT OFFICE.

RALPH OTIS DEULEN, OF BRIDGEPORT, NEBRASKA.

CHARGE-PREPARING APPARATUS.

1,228,415.  Specification of Letters Patent.  Patented June 5, 1917.

Application filed December 29, 1916. Serial No. 139,648.

*To all whom it may concern:*

Be it known that I, RALPH OTIS DEULEN, a citizen of the United States, residing at Bridgeport, in the county of Morrill, State of Nebraska, have invented a new and useful Charge-Preparing Apparatus; and I do hereby declare the following to be a full, clear, and exact description of the invention, such as will enable others skilled in the art to which it appertains to make and use the same.

This invention relates to a new and useful charge preparing apparatus for internal combustion engines, whereby a low grade oil may be employed subsequently to the use of gasolene, which is only used to start the engine, thereby increasing the mileage per gallon of fuel.

A further object of the invention is to provide means whereby the charge may be heated before entering the respective combustion chambers of the several engine cylinders.

A further object of the invention is to construct a loop in the charge intake manifold, so that said loop may be inclosed or arranged within the exhaust manifold, whereby the exhaust from the several cylinders may heat the intake manifold, in order to increase the efficiency of the charge, it being the aim to first start the engine by using gasolene as a fuel.

By virtue of this apparatus, it is possible to cease using the gasolene, after raising the temperature of the intake manifold, so that a charge formed from a low grade oil may be pre-heated, hence, additionally volatilized, whereby the efficiency of the same is substantially equal to the efficiency of the usual charge produced from gasolene.

A further object of the invention is to provide means on the intake manifold to confine and deflect the exhaust from the respective exhaust ports of the cylinders about the intake manifold and toward the closed end of the exhaust manifold, in order to insure increasing the temperature of said intake manifold, whereby the charge formed from low grade oil may be intensely and thoroughly pre-heated.

A further object of the invention is to form the intake manifold in order to increase the passage for the charge, particularly where the intake manifold is located within the exhaust manifold.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in side elevation of a portion of an automobile engine, illustrating the exhaust manifold inclosing a looped portion of the intake manifold, in combination with the pair of tanks, a gasolene tank and a low grade oil tank, each of which is connected to the intake manifold.

Fig. 2 is a sectional view on line 2—2 of Fig. 1.

Fig. 3 is a sectional view on line 3—3 of Fig. 2.

Fig. 4 is a sectional view on line 4—4 of Fig. 1.

Fig. 5 is a sectional view on line 5—5 of Fig. 4.

Fig. 6 is a view partly in section and partly in elevation, showing a looped portion of the intake manifold located on the interior of the exhaust manifold, and showing the means for confining and deflecting the exhaust from the respective cylinders about the intake manifold and toward one end of the exhaust manifold.

Fig. 7 is a sectional view on line 7—7 of Fig. 6.

Fig. 8 is a detail perspective view of the combined exhaust confining and deflecting means.

Referring more especially to the drawings, 1 designates the conventional form of carbureter, and 2 a conventional form of engine comprising the four cylinders, 3, 4, 5 and 6, and 7 is a feed pipe leading to and in communication with the carbureter. This feed pipe is provided with branch pipes 8 and 9, which are connected to and in communication with the low grade oil and gasolene tanks, respectively. These tanks 10 and 11 may be any suitable size, shape or configuration, preferably semi-circular in cross section, and which are secured together by the circular band 12, which encircles the two tanks when their flat faces are adjacent each other, as shown in Figs. 1, 4 and 5, clearly. The circular band is provided with lugs 13, which are secured at 14 to the tanks. The band 12 has a laterally projecting T-shaped bracket arm 15, which is secured in any suitable manner at 16 to a stationary part 17 of the frame of the automobile. The tanks 10 and 11 have the usual flanged filling openings 17 and 18, on which the caps 19 and 20 are threaded.

The branches 8 and 9 of the feed pipe 7 are provided with valves 21 and 22, which have handles 23 and 24 to be actuated by the rods 25 and 26, which, in turn, may be actuated in any suitable manner (not shown). Mounted upon and connected to the engine cylinders, in any suitable manner, is an elongated exhaust manifold 27, so that the exhaust ports 28, 29, 30 and 31 from the respective engine cylinders may communicate therewith. One end of the exhaust manifold is provided with a downwardly protruding closed end portion 32, the other end of the manifold having an annular flange 33, which is connected by the bolts 34 to the usual exhaust 35, which in turn may be connected to the usual form of muffler (not shown).

Extending from and in communication with the carbureter is a charge feed pipe 36, which enters the downwardly extending closed end 32 of the exhaust manifold 27. This pipe 36, beyond where it enters the end 32, extends along and adjacent the upper wall of the exhaust manifold, and directly across the several exhaust ports 28 to 31, inclusive, so that the exhaust from the several ports, while at its highest possible temperature may play directly upon the charge conveying pipe 36, thereby increasing the temperature of the charge, hence, volatilizing the particles of low grade oil or fuel therein. This charge conveying or feed pipe 36, after passing the mouth of the exhaust port 31, merges into a loop 37, and hence into a return portion 38. This return portion 38, at a point substantially between the cylinders 4 and 5, as shown at 39, extends downwardly and passes through the lower wall of the exhaust manifold, and merges into the intake manifold 40, which is in communication with the several intake ports 41, 42, 43 and 44 of the respective engine cylinders.

When first starting the engine, an initial charge, by the use of gasolene (which is allowed to flow by opening the valve 22) is formed in the carbureter. This charge is conveyed by the pipe 36 into the intake manifold and hence to the respective cylinder. After the engine is under way, and that portion of the charge feed pipe which passes across the mouths of the several exhaust ports becomes thoroughly heated to a very high temperature, the gasolene fuel is turned off, by closing the valve 22, after which the valve 21 is opened in order to permit the low grade oil fuel to enter the carbureter, which may be of a kind in which a charge may be formed from either gasolene or any suitable low grade oil. The charge now having been formed from any suitable low grade oil, and the proper supply of air, is conveyed through the pipe 36 to the intake manifold, and since that portion of the pipe 36, which passes the mouths of the several exhaust ports, has become thoroughly heated to a very high temperature, incident to the exhaust playing on said pipe, the charge is pre-heated and additionally volatilized, thereby increasing the efficiency of the charge substantially equal to the efficiency of the charge formed from gasolene. Owing to that portion of the pipe 36 which passes across the mouths of the several exhaust ports being formed into a loop and provided with a return portion, and located on the interior of the exhaust manifold, the passage of the charge is increased, in order to insure the preheating and additional volatilization of the charge.

In Figs. 6 and 7, tubular members 45 are provided, each of which has a restricted tubular portion 46 fitted upon and secured at 47 to the portion 48 of the charge feed pipe 36. Each tubular member or sleeve has an open end 49, which faces toward the closed end of the exhaust manifold. The side of each sleeve or member 45 has an opening 50 which extends from the restricted sleeve to the open end 49. These sleeves or members 45 are so arranged as to overlie the exhaust ports 28 to 31, inclusive, so that said exhaust ports will communicate with the interiors of said sleeves or members, through their openings 50, whereby the exhaust from the respective ports will play and be confined for a short period directly upon the portion 48 of the charge intake pipe 36, in order to increase the temperature of the heat of said portion of the pipe 36. The exhaust is not only directed toward and confined on said pipe, but is deflected toward the closed end 32 of the exhaust manifold, and since the portion 48 of said pipe is adjacent the upper wall of the exhaust manifold, the deflected exhaust, when it reaches the closed end 32, is deflected back through the under portion of the exhaust manifold, and in contact with the return portion 38 of said pipe 36. By virtue of this construction, the temperature is so highly efficient, that it may be assured that the efficiency of the charge, when formed from low grade oil, is substantially equal to the charge, when formed of gasolene, thereby increasing the mileage per gallon of fuel employed.

The invention having been set forth, what is claimed as new and useful, is:—

In an apparatus of the kind set forth, the combination with a multiple cylinder engine, of an exhaust manifold having a downwardly extending closed end, and an intake manifold connected to the exhaust and intake ports respectively of the cylinders of the engine, a charge feed pipe extending from the carbureter of the engine into one end of the exhaust manifold, extending across the mouths of said exhaust ports, turned into a loop and merging into a return portion connected to and in communication with the intake manifold, and means on and carried by that portion of the charge intake pipe extending across the exhaust ports to confine the exhaust directly upon said pipe, said means comprising sleeves having an open side and end, the open side of each adjacent an exhaust port, whereby the exhaust will be confined on said pipe, said open end facing in a direction toward the closed end of the exhaust manifold, whereby the exhaust may return under said pipe.

In testimony whereof I have signed my name to this specification in the presence of two subscribing witnesses.

RALPH OTIS DEULEN.

Witnesses:
T. B. ESTILL,
K. W. MCDONALD.